(12) United States Patent
Shiota et al.

(10) Patent No.: US 6,482,544 B1
(45) Date of Patent: Nov. 19, 2002

(54) BATTERY PACKAGE

(75) Inventors: Hisashi Shiota, Tokyo (JP); Shigeru Aihara, Tokyo (JP); Daigo Takemura, Tokyo (JP); Shoji Yoshioka, Tokyo (JP); Makiko Kise, Tokyo (JP); Jun Aragane, Tokyo (JP); Hiroaki Urushibata, Tokyo (JP); Yasuhiro Yoshida, Tokyo (JP); Michio Murai, Tokyo (JP); Kenji Kawaguchi, Tokyo (JP); Hironori Ozaki, Tokyo (JP); Hideo Ichimura, Tokyo (JP); Masaharu Moriyasu, Tokyo (JP); Shinji Nakadeguchi, Tokyo (JP); Takashi Nishimura, Tokyo (JP); Hisashi Tsukamoto, Saugus, CA (US)

(73) Assignees: Mitsubishi Denki Kabushiki Kaisha, Tokyo (JP); Japan Storage Battery Co., Ltd., Kyoto (JP)

( * ) Notice: Subject to any disclaimer, the term of this patent is extended or adjusted under 35 U.S.C. 154(b) by 0 days.

(21) Appl. No.: 09/608,007

(22) Filed: Jun. 30, 2000

(51) Int. Cl.⁷ .............................. H01M 2/08; H01M 2/00
(52) U.S. Cl. ..................... 429/185; 429/176; 429/186
(58) Field of Search ................................ 429/185, 176, 429/178, 175, 163, 174, 180, 186, 181, 344, 335; 523/134

(56) References Cited

U.S. PATENT DOCUMENTS

| | | |
|---|---|---|
| 4,997,732 A | 3/1991 | Austin et al. |
| 5,981,107 A | 11/1999 | Hamano et al. |
| 6,024,773 A | 2/2000 | Inuzuka et al. |
| 6,051,342 A | 4/2000 | Hamano et al. |
| 6,106,973 A * | 8/2000 | Sonozaki et al. ........... 429/162 |
| 6,124,061 A | 9/2000 | Hamano et al. |
| 6,136,471 A | 10/2000 | Yoshida et al. |
| 6,207,271 B1 * | 3/2001 | Daroux et al. .............. 428/344 |
| 6,231,626 B1 | 5/2001 | Yoshida et al. |
| 6,232,014 B1 | 5/2001 | Shiota et al. |
| 6,235,066 B1 | 5/2001 | Inuzuka et al. |
| 6,291,102 B1 | 9/2001 | Yoshida et al. |

FOREIGN PATENT DOCUMENTS

JP          10-172606          6/1998

* cited by examiner

*Primary Examiner*—Stephen Kalafut
*Assistant Examiner*—R Alejandro
(74) *Attorney, Agent, or Firm*—Oblon, Spivak, McClelland, Maier & Neustadt, P.C.

(57) ABSTRACT

A battery package including laminate sheets adhered each other along their peripheral to form a container portion for receiving an electrode assembly and a seal portion. The seal portion surrounds the container portion and protrudes outwardly from side faces of the container portion. The seal portion has enough width to maintain the container portion free from moisture for long periods of time. The laminate sheets include a heat-adhesive polymer layer and a metal layer which stops moisture and provides a shape-maintaining ability to the laminar sheets. The seal portion is folded or curled to reduce a projection area of the battery package.

3 Claims, 6 Drawing Sheets

BATTERY PACKAGE

BACKGROUND OF THE INVENTION

1. Field of the Invention

The present invention relates to a lightweight battery package for sealing an electrode assembly.

2. Description of the Prior Art

Batteries are utilized as main power supplies or backup sources in variety of devices. Recently, with an astonishing advance in portable electric devices, there is a high level interest in high-performance rechargeable batteries, such as lithium ion batteries.

A conventional lithium ion battery is provided as a sealed battery in a metal package, in which a cathode, an anode and an electronically insulating and electrolyte-holding separator interposed between the electrodes are incorporated in a shape of a cylinder. However, since the package is made of metal, the battery is heavy and difficult to reduce its thickness. Accordingly, with the development of portable electric devices, there exists a need in the art for a battery which has light weight and thin body.

One of the solution of the problem is disclosed in the Japanese laid-open patent publication No.H10-172606, in which a laminate sheet, a polymer sheet having metal layer such as Al layer evaporated thereon, is used as a package instead of the conventional metal package.

FIGS. 6A and 6B shows a structure of such battery using the laminate-sheet package. An electrode assembly 2 including a cathode, an anode and a separator, which are unified by adhesion, is enveloped with electrolyte in the package 7 which is formed with two laminate sheets 4 and 6. The laminate sheets 4 and 6 are mainly composed of polymer sheet in order to reduce its weight and have metal layer evaporated thereon. The metal layer helps the permeable polymer sheet to shut off moisture. The metal layer is made of lightweight Al and has thickness of about 10 to 15 $\mu$m.

The inner surfaces of the laminate sheet 4 and 6 are made of heat-adhesive polymer. The laminate sheets 4 and 6 are heat-sealed together at the periphery of the electrode assembly 2 to seal the package 7. The heat-sealed portion 8 protrudes outwardly from the side faces of the battery. In order to prevent the water permeation into the package for long periods, the heat-sealed portion 8 must be formed wide, the width of which is generally several to 10 mm.

The lead terminals 12 for electrically accessing the electrode assembly 2 from outside of the package are drawn out through the seal portion 8. Thus constructed battery is lighter and thinner than the battery using the metal package.

However, such constructed light and thin battery has some drawbacks as described below. Since the sealed portion 8 of the laminate sheets 4 and 6 has a flange-like shape protruding outwardly from the side face of the battery, a projection area of the battery is larger than that of the metal-package battery. This reduces its volumetric energy density. On the other hand, the width of the seal portion 8 affects the sealing ability of the battery. If the width of the seal portion 8 is narrow, it is impossible to prevent moisture permeation from air for a long duration of the battery operation. Particularly, the lithium ion secondary battery may generate HF by the chemical reaction of the electrolyte with the permeated water, and the generated HF causes peeling of the seal. For keeping high reliability, it is preferable that the width of the seal portion is as wide as possible. In general, the width of the seal portion must be greater than several mm in minimum. Therefore, there exists a trade-off between the volume energy density and the reliability of the battery.

SUMMARY OF THE INVENTION

It is accordingly an object of the present invention to provide a battery package which can reduce weight and thickness of the battery and has small projection area and high reliability.

According to the present invention, the battery package comprises laminate sheets adhered each other along their peripheral to form a container portion for receiving an electrode assembly and a seal portion surrounding said container portion and protruding outwardly from side faces of said container portion, said seal portion having enough width to maintain said container portion free from moisture for long periods of time, wherein said laminate sheets include a heat-adhesive polymer layer and a metal layer which stops moisture and provides a shape-maintaining ability to said laminate sheets, and wherein said seal portion is folded or curled to reduce a projection area of said battery package.

This battery package improves the volumetric energy density of the battery by reducing its projection area, while maintaining the reliability of the battery with wide seal portion.

The laminate sheets preferably maintain their shape, when folded or curled, without breaking the metal layer therein. For this purpose, the thickness of the metal layer is preferably in a range of 30 to 100 $\mu$m and larger than half of the thickness of the polymer layer. This prevents an occurrence of cracks in the metal layer when the seal portion is folded or curled, and thus improves the reliability of the battery.

The metal sheet is preferably made of Al or Al alloy to reduce the weight of the package.

BRIEF DESCRIPTION OF THE DRAWINGS

The above and other objectives and features of the present invention will become more apparent from description of preferred embodiments thereof with reference to the accompanying drawings, throughout which like parts are designated by like reference numerals, and wherein:

(FIG. 4A, 4B and 4C shows a folding pattern of one, two and four times folding, respectively.)

DETAILED DESCRIPTION OF THE PREFERRED EMBODIMENTS

The application is based on applications No.H11-000132 filed in Japan, the content of which is incorporated herein by reference.

Embodiment 1

Figure 1A:
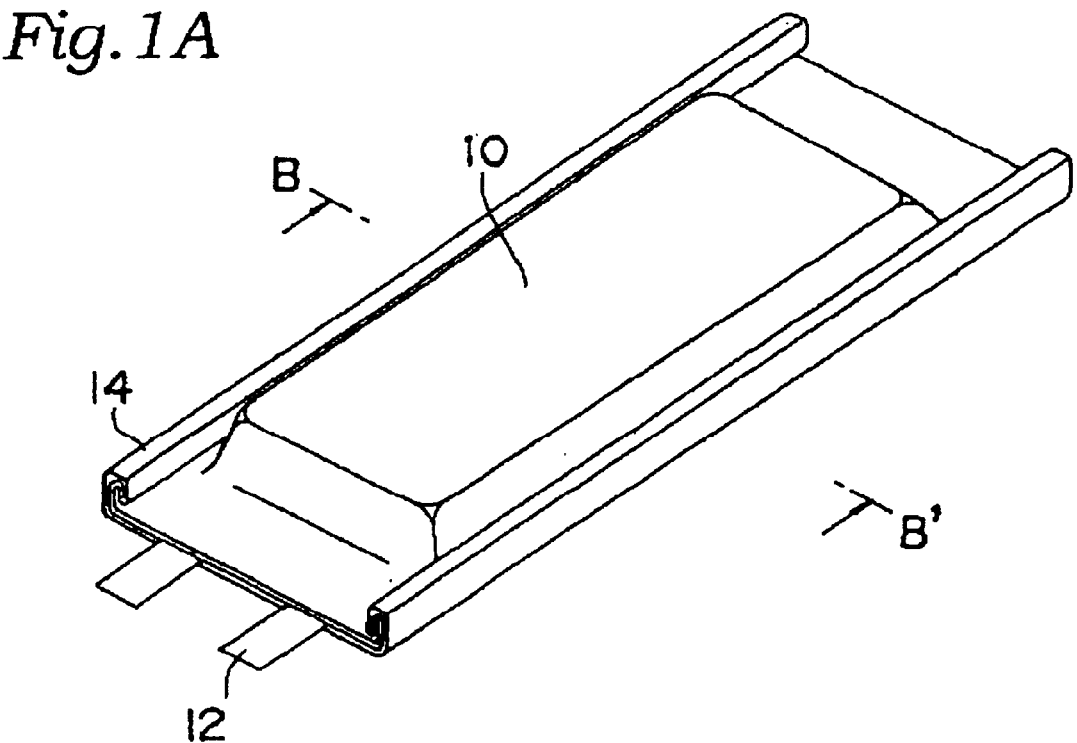
FIG. 1A is a perspective view of a battery using a battery package according to a first embodiment of the present invention.
Figure 1B:
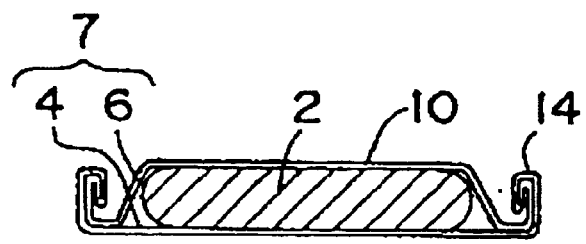
FIG. 1B is a cross sectional view of the battery in FIG. 1A.

Referring to FIGS. 1A and 1B, a battery assemble includes an electrode assembly 2, electrolyte (not shown), package 7, and lead terminals 12 for connecting the electrode assembly 2 with outside of the package 7. The electrode assembly 2 has a cathode, an anode and a separator. The package 7 seals the electrode assembly 2 and the electrolyte.

The package 7 is composed of a box-shaped laminate sheet 6 and a flat laminate sheet 4, which are adhered each other. The package 7 has an electrode assembly receiving portion (=container portion) 10 and a seal portion 14 surrounding and protruding from the electrode assembly receiving portion 10. The electrode assembly 2 is received in the box-shaped container portion 10 of the laminate sheet 6. The seal portion 14 is formed wide so that the electrode assembly 2 is shut off from moisture for long periods of time. For example, the seal portion 7 has a width of several to 10 mm. The seal portion 7 is bent upwardly from a boundary between the seal portion 7 and the container portion 10 along longer sides of the package 7. Further, the edges of the bent seal portion 7 are bent back downwardly so that the seal portion 7 has a lower height than the container portion 10.

The laminate sheets 4 and 6 consist of a heat-adhesive polymer layer, such as polypropylene or polyethylene, an Al layer (=the metal layer) laminated thereon and a protective polymer layer covering the Al layer. The heat-adhesive layers of the two laminate sheets are adhered to each other at the seal portion 14. While Al layer or Al-alloy layer is preferable for the metal layer in view of reducing weight, Ni layer or stainless steel layer may be employed. In the present invention, the metal layer is thicker than that in a conventional laminate sheet package, so that the meta layer has two functions: One function is to provide a shape-keeping ability to the laminate sheet; and another is function to shut out moisture. The shape-keeping ability allows the seal portion 14 to keep its bent shape.

Thus constructed battery can maintain its seal for a long term and has small projection area, because the seal portion 14 is so wide and has a folded shape.

While the metal layer is plastic and easily shaped, the polymer layer is generally elastic. Accordingly, the metal layer must be thick to provide a shape-keeping ability to the laminate sheet which has the polymer layer and the metal layer adhered together.

When the laminate sheet is folded placing the polymer layer at inside, a compressive strain is laid on the polymer sheet and a tensile strain is laid on the metal layer. Accordingly, when the thickness of the metal layer and polymer layer are inadequate, cracks may occur in the metal layer. If cracks occur, moisture can easily permeate through the cracks. The permeated water reacts with the electrolyte and may generate HF, which may cause separation of the adhered sheets. This seriously influences the reliability of the battery. We conducted a test as follows to investigate an adequate thickness of the metal layer and polymer layer.

Figure 4A:
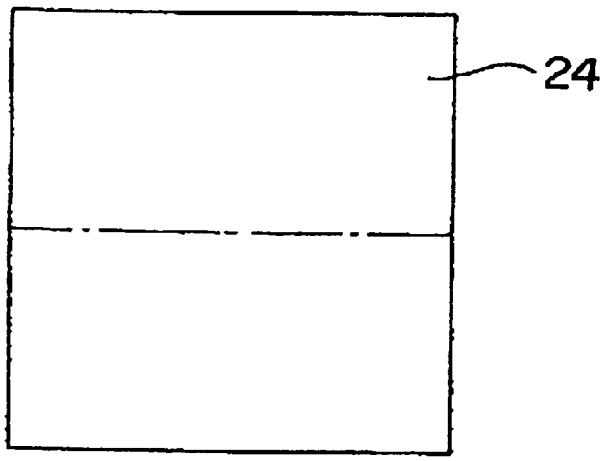
FIGS. 4A to 4C show a method in a folding test of laminate sheets.
Figure 4B:
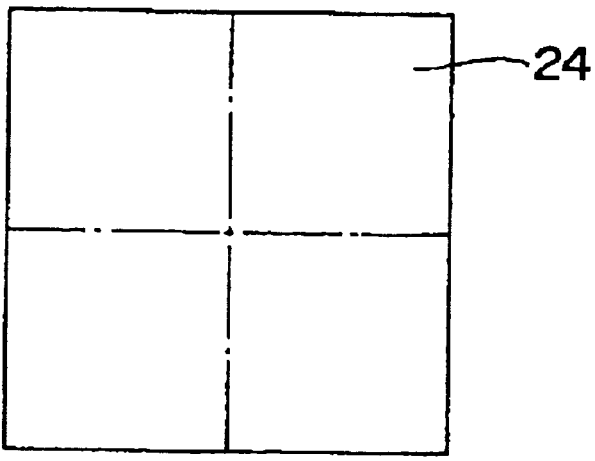
Figure 4C:
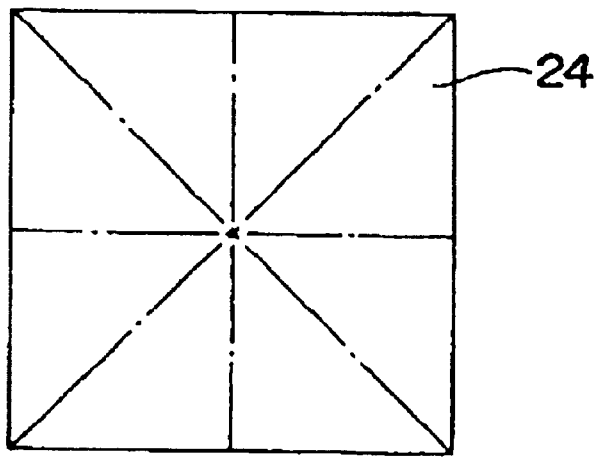

We provided several kinds of laminate sheets, which were made of different material and had different thickness, and measured a tensile strength, a crack-occurring folding number and a shape-keeping ability. The tensile strength was measured with a separate metal layer by means of a tensile test for metallic material. The crack-occurring folding number was measured by folding the laminate sheet in a manner showed in FIGS. 4A to 4C and determining the times of folding when cracks occur in the metal layer. FIGS. 4A, 4B and 4C shows positions of folding axis as chain lines when the laminate sheet 24 is folded one, two and four times, respectively. The shape-keeping ability was estimated by qualitatively judging whether the laminate sheet keeps its shape or not after 90-degree bending. The laminate sheet 24 was composed of a polymer layer, an Al-alloy layer laminated thereon, and a protective polymer layer covering the Al-alloy layer. The polymer layer was selected from the group including polyethylene (PE), ethylene acrylate copolymer (EAA) and undrawn polypropylene (CPP). The Al-alloy layer was selected from Al alloy of No. 1050, 1N30, 1200 and 8021. The protective polymer layer was selected from polyethylene terephthalate (PET), nylon and EAA.

Table 1 shows results of the test. First, we discuss about the crack-occurring folding number. The tests No.1 to 4 were conducted to investigate an influence of material of the metal layer. Difference in the crack-occurring folding number was observed according to the metal-layer material. The results indicate that the metal layer having low tensile strength is apt to crack. This teaches that the metal layer with high tensile strength is preferable in the present invention.

The tests No. 5 to 8 were for investigating an influence of the thickness of the polymer layer. The thicker the polymer layer was, the easier the cracks occurred in the metal layer. When the thickness of the polymer was larger than twice that of the metal layer, the crack-occurring folding number decreased noticeably. The tests No. 9 to 13 were for investigating the thickness of the metal layer. The thinner the metal layer was, the easier the cracks occurred in the metal layer. When the thickness of the metal layer was less than half of the polymer layer thickness, the crack-occurring folding number decreased significantly. These results teach that the thickness of the metal layer is preferably larger than half of the polymer layer thickness.

The tests No. 11, and 14 to 16 were for investigating influences of thickness and material of the protective polymer layer. The tests No. 11, 17, 18, 13, 19 and 20 were for investigating an influence of material of the polymer sheet. However, the results of these tests showed little dependency on thickness and material of the protective polymer layer or the material of the protective polymer layer. This indicates that influences of these parameters are small.

Next, we discuss about the shape-keeping ability. The results in Table 1 show that the laminate sheet can keep its shape when the thickness of the metal layer is larger than 30 $\mu$m.

According to these tests, the thickness of the metal layer is preferably larger than 30 $\mu$m and larger than half of that of the polymer layer. This provides the shape-keeping ability to the laminate sheet and prevents an occurrence of cracks in the metal layer when the laminate sheet is bent.

TABLE 1

| Test No. | polymer layer | metal layer | protective polymer layer | tensile strength (N/cm²) | crack-occurring folding number | shape-keeping ability* |
|---|---|---|---|---|---|---|
| 1 | PE/50 μm | 1050/20 μm | PET/10 μm | 58 | 2 | X |
| 2 | PE/50 μm | 1N30/20 μm | PET/10 μm | 67 | 4 | X |
| 3 | PE/50 μm | 1200/20 μm | PET/10 μm | 80 | 4 | X |
| 4 | PE/50 μm | 8021/20 μm | PET/10 μm | 95 | 4 | X |
| 5 | PE/10 μm | 1N30/20 μm | PET/10 μm | 67 | 8 | X |
| 6 | PE/20 μm | 1N30/20 μm | PET/10 μm | 67 | 8 | X |
| 7 | PE/40 μm | 1N30/20 μm | PET/10 μm | 67 | 8 | X |
| 8 | PE/80 μm | 1N30/20 μm | PET/10 μm | 67 | 2 | X |
| 9 | PE/50 μm | 1N30/10 μm | PET/10 μm | 63 | 2 | X |
| 10 | PE/50 μm | 1N30/20 μm | PET/10 μm | 67 | 4 | X |
| 11 | PE/50 μm | 1N30/30 μm | PET/10 μm | 70 | 8 | ○ |
| 12 | PE/50 μm | 1N30/50 μm | PET/10 μm | 75 | 8 | ○ |
| 13 | PE/50 μm | 1N30/100 μm | PET/10 μm | 80 | >8 | ○ |
| 14 | PE/50 μm | 1N30/30 μm | PET/20 μm | 70 | 8 | ○ |
| 15 | PE/50 μm | 1N30/30 μm | Nyron/10 μm | 70 | 8 | ○ |
| 16 | PE/50 μm | 1N30/30 μm | EAA/20 μm | 70 | 8 | ○ |
| 17 | EAA/50 μm | 1N30/30 μm | PET/10 μm | 70 | 8 | ○ |
| 18 | PP/50 μm | 1N30/30 μm | PET/10 μm | 70 | 8 | ○ |
| 19 | CPP/40 μm | 1N30/100 μm | PET/10 μm | 80 | >8 | ○ |
| 20 | PP/50 μm | 1N30/100 μm | PET/10 μm | 80 | >8 | ○ |

*after 90-degree bending; ○: keeping the bent shape; X: not keeping the bent shape While it is not shown in Table 1, pinholes were apt to occur in the metal layer when the metal layer was thin. When the thickness of the metal layer was larger than 30 μm, the pinholes were not observed. Therefore, the above described preferable range of the metal layer thickness is also preferable for preventing pinhole occurrence and maintaining reliability of a battery.

The thicker the metal layer is, the better the shape-keeping ability and cracks or pinhole preventing ability become. However, in view of reducing cost, the thickness of the metal layer is preferably less than 100 μm.

Accordingly, the thickness of the metal layer is preferably in a range of 30 to 100 μm and larger than half of that of the polymer layer.

Embodiment 2

Figure 2A:
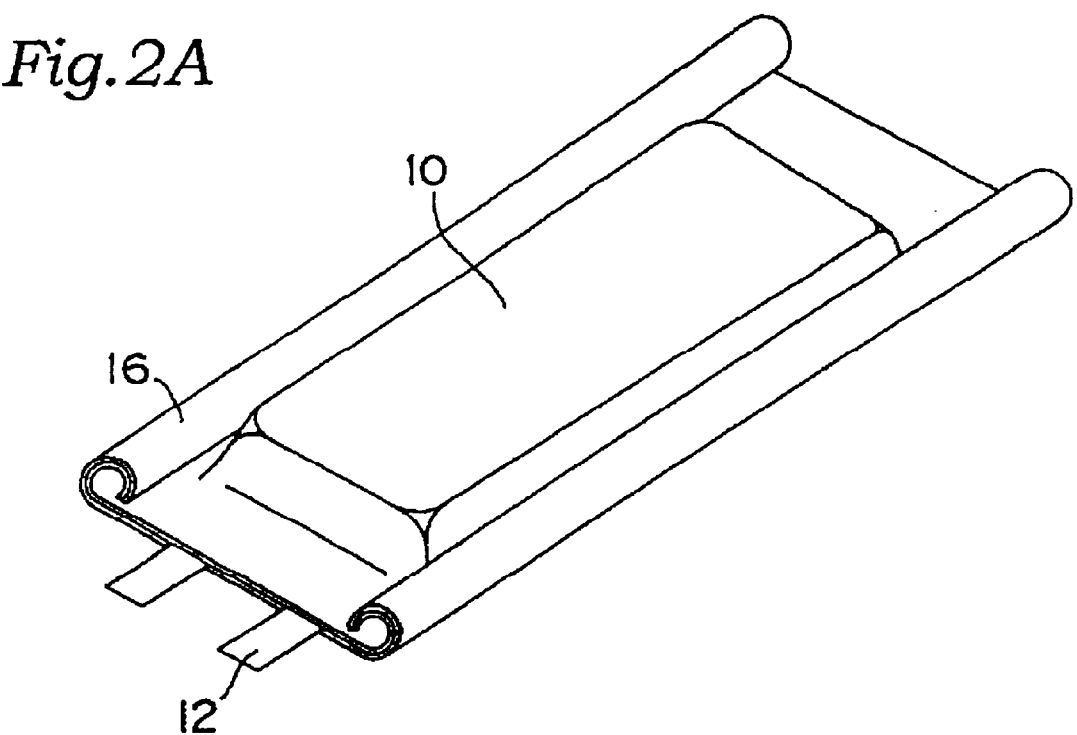
FIG. 2A is a perspective view of a battery using a battery package according to a second embodiment of the present invention.
Figure 2B:
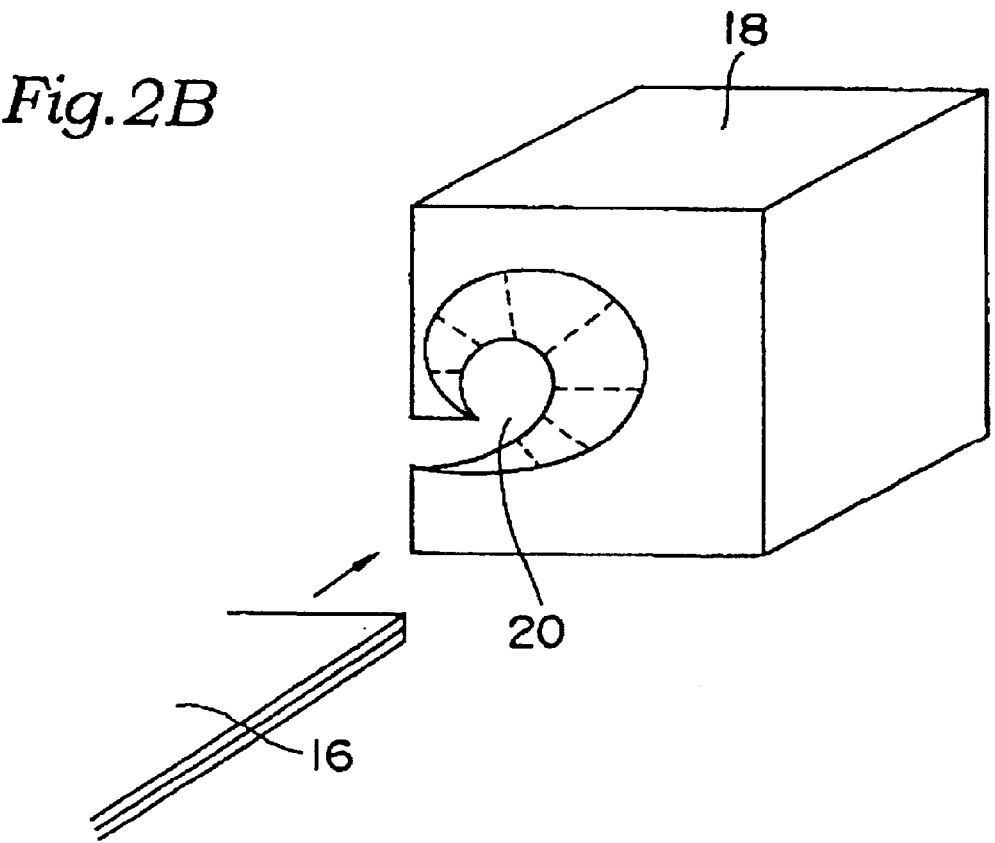
FIG. 2B is a perspective view of a curling device for forming a seal portion of the battery in FIG. 2A.

Referring to FIG. 2A, a package 7 of a battery includes an electrode assembly receiving portion 10 and a seal portion 16, as well as in embodiment 1. However, the shape of the seal portion 16 is different from that in embodiment 1. The seal portion 16 is curled toward the electrode assembly receiving portion 10 to form a cylindrical shape. A curling former 18, for example as shown in FIG. 2B, may be used to shape the seal portion 16 in the curling region 20

Although a projection area of the seal portion 16 having such shape becomes larger than that in embodiment 1, the battery package of this embodiment is advantageous in that the crack occurrence in the metal layer is reduced. Because the seal portion 16 has a gentle and constant curvature.

Embodiment 3

Figure 3A:
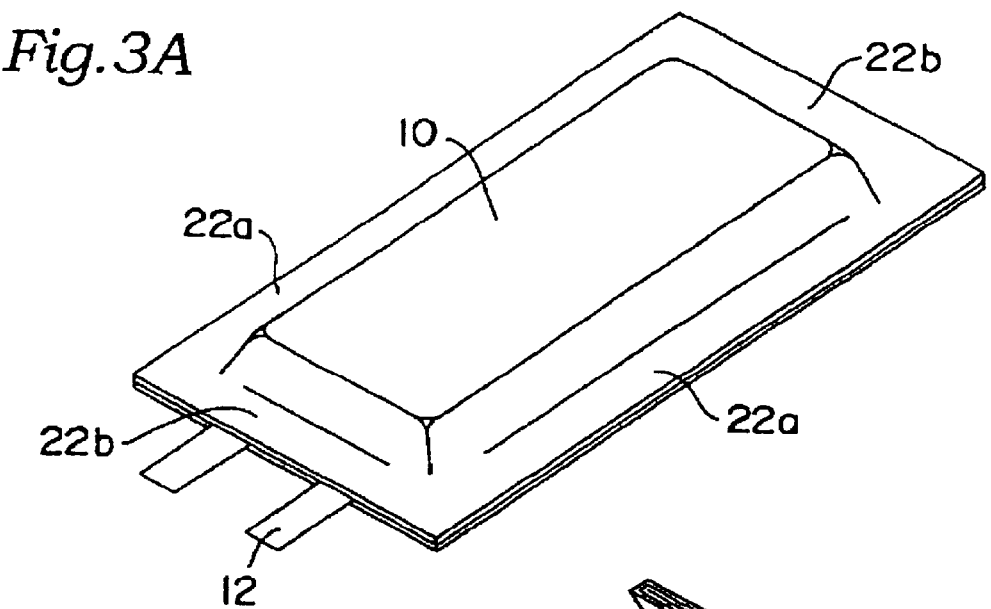
FIGS. 3A to 3C show a forming process of a battery package according to a third embodiment of the present invention.
Figure 3B:
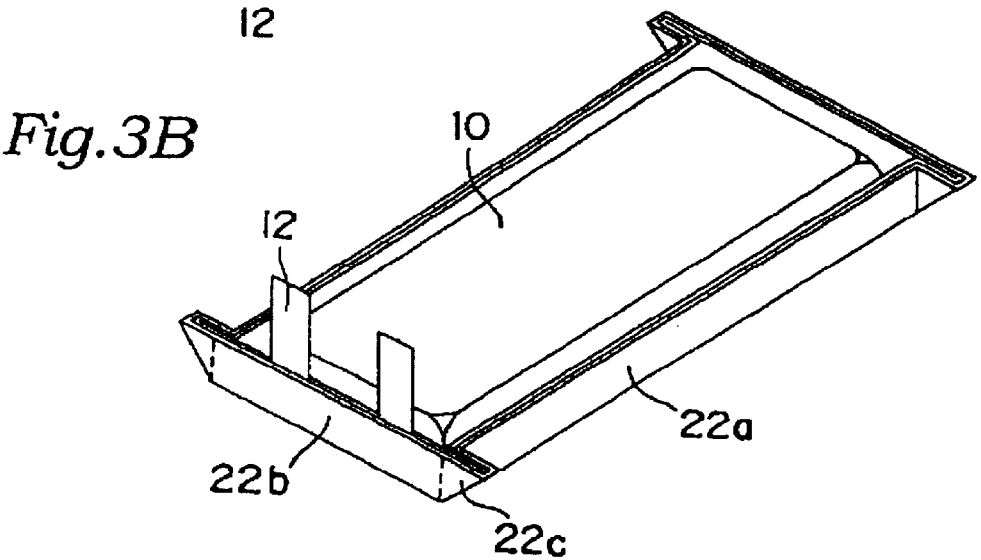
Figure 3C:
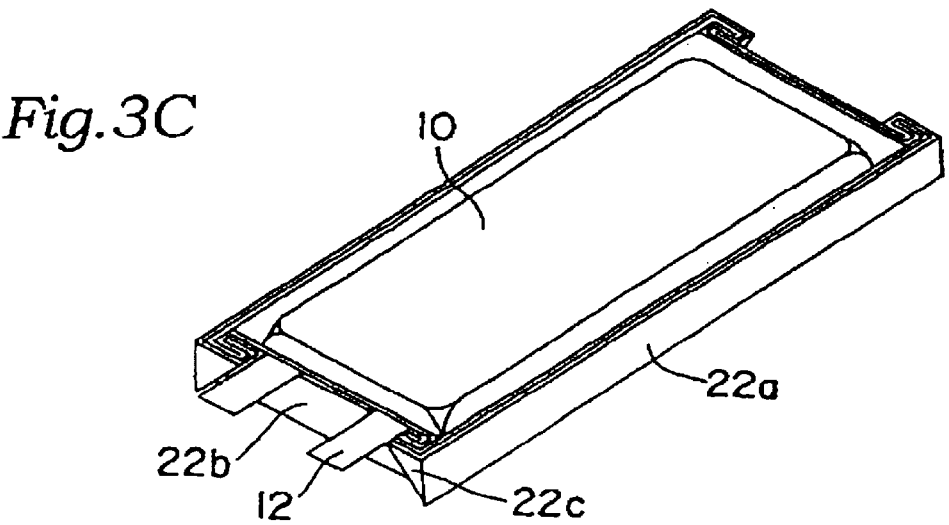

FIGS. 3A to 3C show a forming method of a battery according to an embodiment 3 of the present invention. The battery of this embodiment has a similar construction as that in embodiment 1 except for a shape of a seal portion 22. In this embodiment, the seal portion 22 is folded not only along the longer side but also along the shorter side of the package. First, the seal portion 22a parallel to the longer side of the package is bent upwardly. Then, the seal portion 22b parallel to the shorter side of the package is also bent upwardly. As shown in FIG. 3B, a crossed portion 22c between the seal portion 22a and the seal portion 22b is folded like a pocket in a triangular shape. Next, as shown in FIG. 3C, the crossed end portion 22c is folded toward the shorter side of the package to be joined with the seal portion 22b. Since the lead 12 withdrawn from an electrode assembly is bent upwardly with the seal portion 22b and looks toward the perpendicular direction to the package as shown in FIG. 3B, the lead 12 is bent again to the parallel direction to the package as shown in FIG. 3C to facilitate an electrical connection of the lead 12 to an outer circuit.

EXAMPLES

The following examples are offered for purposes of illustration only, and are intended neither to define nor limit the invention in any manner.

Example 1

An electrode assembly was fabricated as follows. An active material for cathode including 87 wt % of LiCoO$_2$, 68 wt % of graphite powder KS and 5 wt % of binder (polyvinylidene fluoride) was applied in 100 μm thick on an Al foil having a thickness of 20 μm to form a cathode. An active material for anode including 95 wt % of mesophase microbeads carbon (Osaka gas corp.) and 5 wt % of binder was applied in 100 μm thickness on a copper foil having a 20 μm thickness. A porous polyethylene sheet as a separator was sandwiched between the cathode and the anode, and they were adhered to form one sheet structure. The sheet was cut and wound to form an electrode assembly, of which cathode and anodes were attached with an Al and copper lead, respectively. After the electrode assembly was dried, the electrode assembly was immersed in an electrolyte including LiPF$_6$ and ethylene carbonate/diethyl carbonate, and was charged at a current density of 1 mA/cm² for 0.5 to 1.0 hours. Then, the electrode assembly was pulled out from the electrolyte.

A cover and bottom membrane of a package was made from a laminate sheet as follows. A polymer layer of CPP having 50 μm thickness, a metal layer of Al alloy 1N30 having 100 μm thickness and a protective polymer layer of EAA having 20 μm thickness were laminated to form the laminate sheet. The cover membrane of the package was made by forming the laminate sheet into a flanged-box shape by means of a draw forming. The size of the cover membrane including the flange portion was 41.7×138.5 mm. The box-shaped portion of the cover membrane had a trapezoid cross section. The bottom face of the box-shaped portion had a size of 31.7×128.5 mm, and the upper face had a size of 28.6×125.4 mm and the height was 6.5 mm. The bottom membrane of the package was made by cutting the laminate sheet in the size of 41.7×138.5 mm.

The electrode assembly was mounted on the bottom membrane of the package, and the cover membrane was placed over the electrode assembly sandwiching the lead between its flange portion and the bottom membrane. The polymer layers of the cover and the bottom membrane were placed to face each other. The flange portion the package cover and the package bottom were adhered each other to form a seal portion by pressing at 1 kg/cm$^2$ and heating at 150° C. for one second under 50 torr. The width of the seal portion was about 5 mm.

The seal portion was folded along the longer side of the package in the manner shown in FIG. 1 by means of a press. After the press, the seal portion could keep the pressed shape. Cracks in the Al alloy layer were not observed. Thus constructed battery had a projection area of 4.7 cm$^2$, which was 20% smaller than that before folding the seal portion (=5.8 cm$^2$).

Example 2

An electrode assembly was fabricated in the same manner as in Example 1. A polymer layer of PE having 50 μm thickness, a metal layer of Al alloy 1N30 having 30 μm thickness and a protective polymer layer of PET having 12 μm thickness were laminated to form the laminate sheet. In this example, a draw forming method was not used to form a package from the laminate sheet. Two planar laminate sheets were faced each other interposing theelectrode assembly, and were adhered each other at a peripheral of the electrode assembly by pressing at 1 kg/cm$^2$ and heating at 150° C. for one second under 50 torr. A width of the seal portion was 5 mm.

Next, the seal portion was folded along the longer side of the package in the manner shown in FIG. 1 by means of a press. Cracks in the Al alloy layer were not observed. Thus constructed battery was subjected to a shelf test under 60° C. and its weight change was measured. The measured data was compared with that of the battery of comparative example 1, which is described below.

Comparative Example 1

A battery was fabricated in the same manner as in Example 2 except for a thickness and material of the laminate sheet. A polymer layer of PE having 80 μm thickness, a metal layer of Al alloy 1N30 having 20 μm thickness and a protective polymer layer of PET having 12 μm thickness were laminated to form the laminate sheet. The seal portion of this battery was folded along the longer side of the package in the manner shown in FIG. 1 by means of a press. Since the seal portion could not keep the folded shape, the seal portion was fastened in the folded shape by means of a band. Cracks were observed in the Al alloy layer in the laminate sheet of this battery. Thus constructed battery was subjected to a shelf test under 60° C. and its weight change was measured, as well as Example 2.

Figure 5:
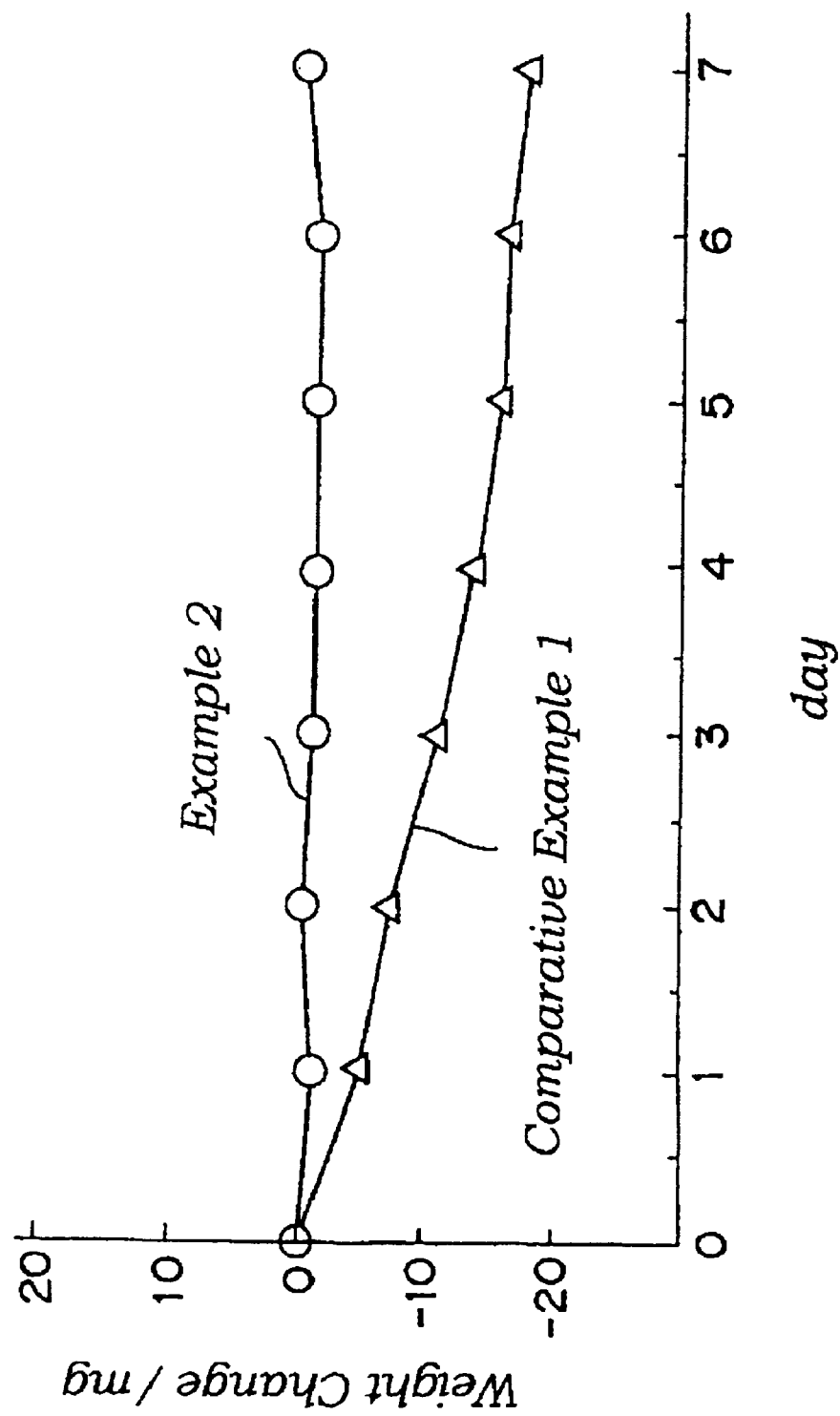
FIG. 5 is a graph showing a weight change of the battery versus duration time in a shelf test.
Figure 6A:
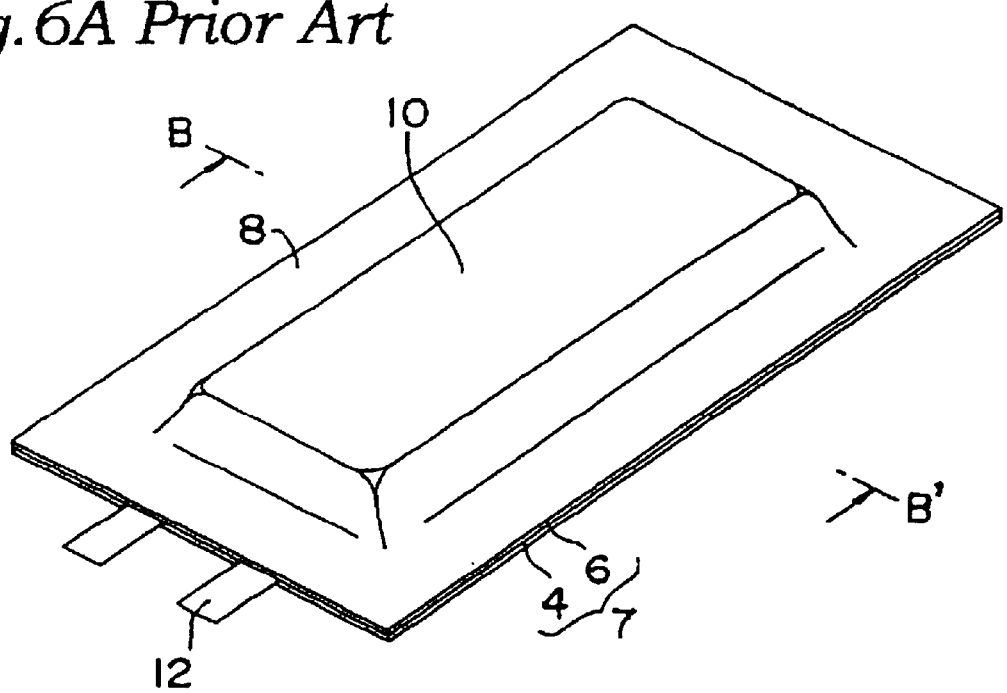
FIG. 6A is a perspective view of a battery using a conventional battery package.
Figure 6B:
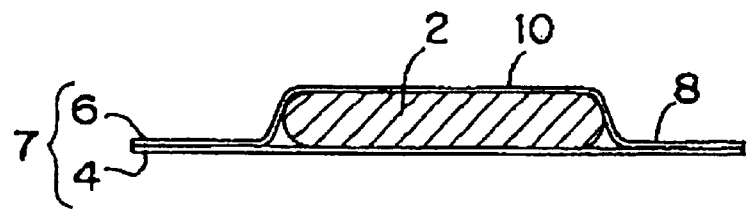
FIG. 6B is a cross sectional view of the battery in FIG. 6A.

FIG. 5 shows the weight change of the battery in Example 2 and Comparative Example 1 under the shelf test at 60° C. The weight of the battery in Comparative Example 1 decreased by 10 mg after one week. The decrement of the weight was due to a leak of electrolyte, which was caused by separation of the adhered sheets at the seal portion. The separation of the laminate sheets was supposedly caused by a permeation of water through the crack in the Al alloy layer. On the other hand, the battery in Example 1 did not show decrement in weight due to an electrolyte leak. This indicates that the package could shut out water and maintained its sealing state well. These results show that the battery of the present invention has a high reliability.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be constructed as being included therein.

What is claimed is:

1. A battery package comprising laminate sheets adhered to each other along the peripheries of said laminate sheets to form a container portion for receiving an electrode assembly and a seal portion surrounding said container portion and protruding outwardly from side faces of said container portion, said seal portion preventing moisture penetration, wherein said laminate sheets include a heat-adhesive polymer layer and a metal layer which prevents moisture penetration and provides a shape-keeping ability to said laminate sheets, and wherein said seal portion is folded or curled onto itself to reduce a projection area of said battery package.

2. The battery package according to claim 1, wherein said metal layer has a thickness in a range of 30 to 100 μm and larger than half of the thickness of said polymer layer.

3. The battery package according to claim 1, wherein said metal layer is selected from the group consisting of Al and Al alloy layer.

* * * * *